(12) United States Patent  
Winterhalter (10) Patent No.: US 8,569,987 B2  
(45) Date of Patent: Oct. 29, 2013

(54) CONFIGURABLE MULTI-AXIS ELECTRIC DRIVE SYSTEM CONCEPT

(75) Inventor: Craig R. Winterhalter, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 335 days.

(21) Appl. No.: 12/887,331

(22) Filed: Sep. 21, 2010

(65) Prior Publication Data

US 2012/0068654 A1    Mar. 22, 2012

(51) Int. Cl.
*H02P 23/00* (2006.01)
*H02P 21/00* (2006.01)

(52) U.S. Cl.
CPC .................. *H02P 21/0089* (2013.01)
USPC ........... 318/494; 318/495; 318/496; 318/497; 318/498; 318/499

(58) Field of Classification Search
CPC .................................................. H02P 21/0089
USPC ......................................... 318/494, 495–499
See application file for complete search history.

(56) References Cited

U.S. PATENT DOCUMENTS

| | | | | |
|---|---|---|---|---|
| 5,742,143 A * | 4/1998 | Katagiri | | 318/625 |
| 6,297,610 B1 * | 10/2001 | Bauer et al. | | 318/562 |
| 6,686,712 B2 * | 2/2004 | Numaguchi et al. | | 318/34 |
| 6,825,634 B2 * | 11/2004 | Tatar et al. | | 318/625 |
| 6,933,698 B2 * | 8/2005 | Miura et al. | | 318/625 |
| 7,426,975 B2 * | 9/2008 | Toyota et al. | | 180/165 |
| 7,705,553 B2 * | 4/2010 | Worrall | | 318/625 |

* cited by examiner

*Primary Examiner* — Bentsu Ro
*Assistant Examiner* — David Luo
(74) *Attorney, Agent, or Firm* — Fletcher Yoder, P.C.; R. Scott Speroff; John M. Miller (57) ABSTRACT

The present invention includes techniques for configuring an electric drive module designed for various multi-axis drive system configurations. Embodiments include techniques for integrating a three phase dual converter with a diode bridge and drive controller within a single drive module. Further integrating the diode bridge directly within the drive module may result in an integrated, modular building block for multiple electric drive system configurations. In some embodiments, multiple electric drive modules are connected by a DC bus to form a system configured for higher energy efficiency.

26 Claims, 7 Drawing Sheets

CONFIGURABLE MULTI-AXIS ELECTRIC DRIVE SYSTEM CONCEPT

BACKGROUND

The invention relates generally to the field of electric drives. More particularly, the invention relates to techniques for configuring electric drives in a multi-axis drive system.

Various power systems include power conversion systems such as electric drives and motors which are employed to convert electrical energy into mechanical energy. An electric drive includes a device or group of devices which controls the torque, speed, position, and/or performance of an electric motor. The drive may be connected to a power source such as a battery, a power supply, or an AC generator. The electric drive controls the electric power from the power source to the motor, which converts the electrical power into mechanical power. The electric drive may also be connected to control circuitry configured to control the power conversion. For example, the control circuitry may control the current, voltage, and/or switching frequency of transistors in the drive.

Electric drives may be used for a wide range of industrial applications. For example, different types of electric drives may drive power to various types of motors, such as AC induction motors, servomotors, DC motors, etc. which perform different motion, such as rotary or linear motion under torque, velocity or position control, etc. The configuration of electric drives for such different mechanical functions may also vary greatly. As such, different types of electric drive configurations may be used depending on the particular application or function of the industrial drive system. For example, basic electric drive configurations include single axis and multi-axis configurations in regenerative bus supply, regenerative braking configurations, etc.

Typically, modularity is an important feature in power conversion systems. Modularity may refer to the adaptability of power conversion components for various industrial drive system applications. For example, drive modularity enables a drive module to be adaptable for various systems and flexible for system expansion. However, typical electric drives are relatively inflexible when converting between different configurations of drive systems. For example, electric drive modules may be further integrated for increased flexibility when switching between different configurations of drive systems such as multi-axis or regenerative braking configurations.

BRIEF DESCRIPTION

The present invention relates generally to a modular electric drive configuration designed to address issues related to modularity, design efficiency, and so forth. Embodiments include techniques for integrating a three phase dual converter within one drive module. Further, embodiments include techniques for integrating a diode bridge directly within the drive module, which results in an integrated, modular building block for multiple electric drive configurations. The increased flexibility achieved by using an integrated modular building block may enable increased control in power delivery.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Modularity in a power conversion system involves using certain building blocks for various configurations of the power conversion system. Such a characteristic is advantageous in different power conversion applications which are capable of driving varying levels of power and employing different electric drive configurations. For example, power usage varies widely in industrial automation systems such as high speed packaging, or converting applications, including systems where energy is transferred back to the power grid. Each different power conversion application may be driven by different configurations of electric drives. In one or more embodiments, an integrated dual converter electric drive module is a modular building block for various electric drive configurations.

Figure 1:
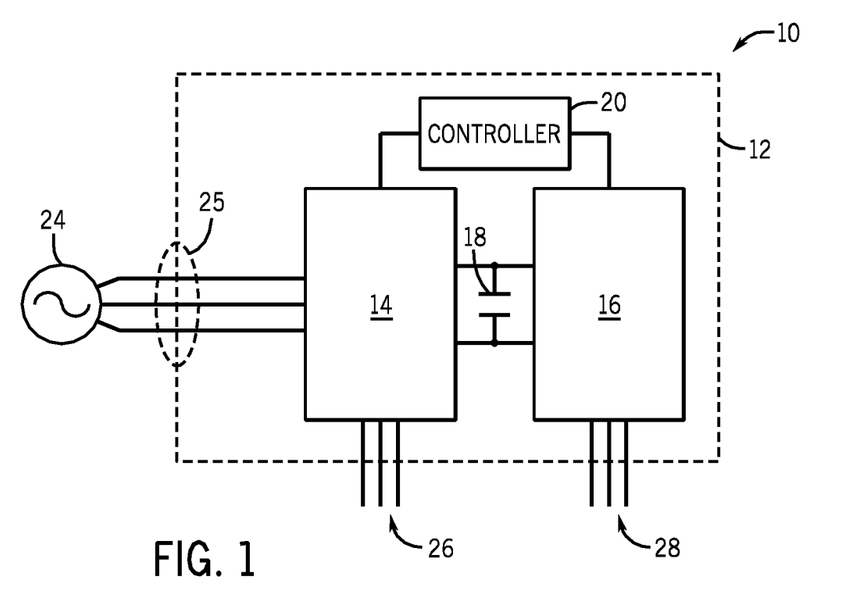
FIG. 1 is a block diagram of dual converter module, in accordance with an embodiment of the present techniques.

An example of a power conversion system in accordance with present embodiments is illustrated in the block diagram of FIG. 1. The system 10 includes a dual converter module 12, which includes 2 converters 14 and 16, a DC capacitor 18, and a controller 20. The dual converter module 12 is so named for the dual converter (e.g., converters 14 and 16) configuration integrated within in one modular component. It should be noted that while converters 14 and 16 are separately referenced, the converters 14 and 16 may have the same configuration, or alternatively, may have different configurations. The dual converter module 12 receives electrical energy at an input/output (I/O) 25 from a power source 24. The I/O 25 may be an input and/or an output in various configurations, as will be discussed. The power source 24 may be a poly-phase power source, as indicated by the three outputs from the source 24. While the illustrated embodiment depicts a three-phase power source, it should be noted that the dual converter module 12 may also be single-phase, or may have any other number of phases.

The converters 14 and 16 are capable of controlling the electrical energy output from the dual converter module 12. For example, the energy output from the dual converter module 12 may be used by a motor which converts the electrical energy into mechanical energy, which may be used to operate various automated industrial applications, as discussed. As set forth above, the dual converter module 12 includes two three-phase converters 14 and 16. The two converters 14 and 16 are linked by the DC capacitor 18, and each converter 14 and 16 is controlled by the controller 20. The controller 20 may control, for example, the current and voltage through the converters 14 and 16, as well as the switching of transistors in the converters 14 and 16. Input/outputs 26 and 28 of the converters 14 and 16, respectively, are routed depending on the application of the system 10, as will be discussed.

In present embodiments, drive modularity may be improved relative to traditional systems by integrating an electric drive module such that the number of building blocks for configuring a given power conversion system may be reduced. For example, typical drives may use discrete converter components, such that building different drive configurations may require many components and types of interconnections. In the illustrated embodiment, drive modularity is improved by integrating two 3-phase converters directly within one module substrate (e.g., a printed circuit board). The module substrate includes the converters 14 and 16, referred to as a three-phase dual-converter, integrated together with the controller 20 in one printed circuit board. It is believed that the integration of the dual converters 14 and 16 will generally decrease the installation time of power conversion systems, as less external parts are installed. Furthermore, the installation of fewer parts will decrease the interconnections between different products, thereby improving the reliability of the power conversion system. For example, present embodiments avoid inclusion of external interconnections between the 2 converters 14 and 16, as both converters 14 and 16 are integrated within the dual converter module 12.

Figure 2A:
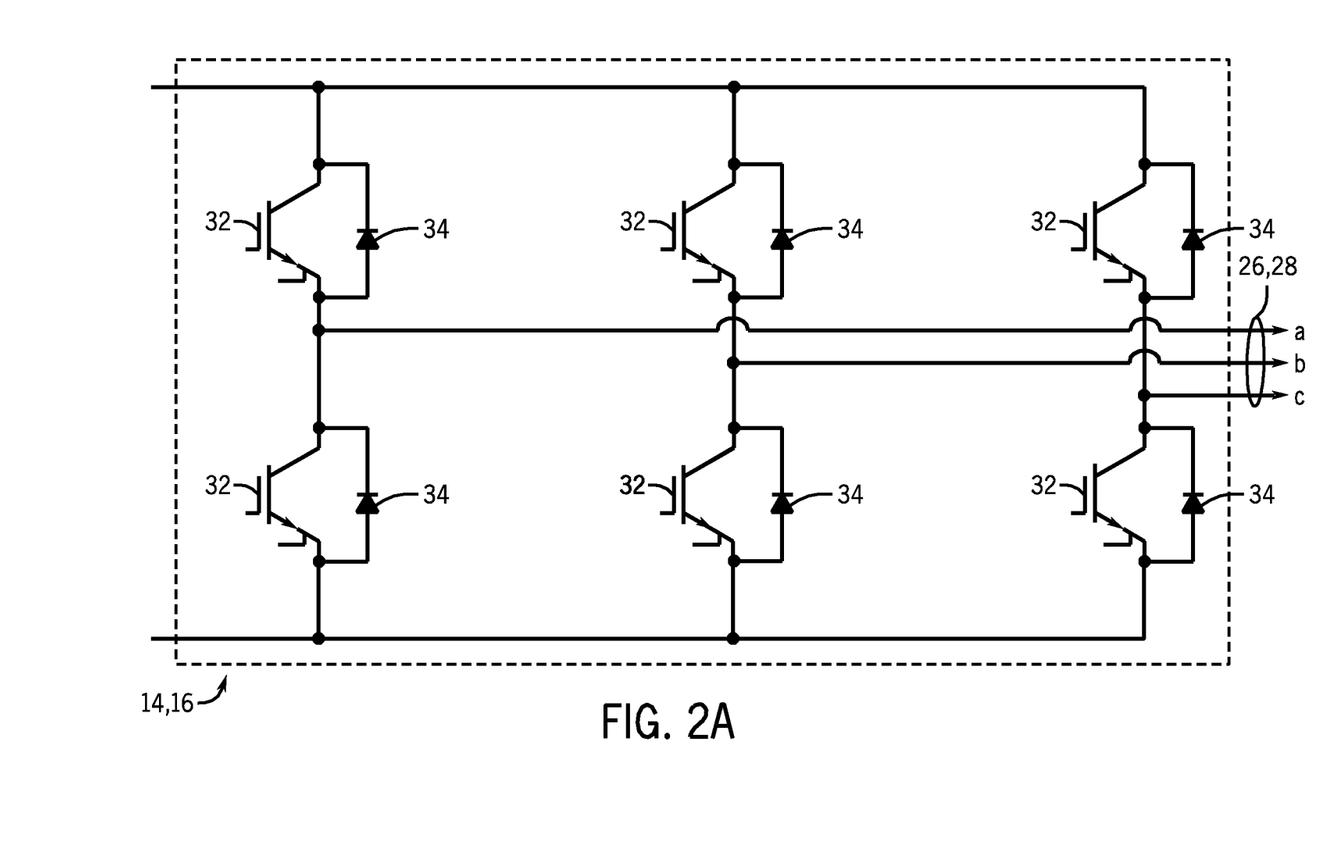
FIG. 2A is a schematic diagram of a 3-phase converter of the dual converter module of FIG. 1, in accordance with an embodiment of the present techniques.

FIG. 2A provides a more detailed depiction of a converter 14 or 16 in accordance with present embodiments. As illustrated in the schematic diagram of FIG. 2A, the converter 14 includes a 3×2 array of transistors 32 and power diodes 34, where each diode 34 is configured antiparallel to the respective transistor 32. The transistors 32 are configured to switch at a certain switching frequency to output three-phase voltages $v_a$, $v_b$, and $v_c$ through the input/output (I/O) 26 or 28, as indicated by lines a, b, or c. The I/Os 26 and 28 may sometimes be an input and/or an output, depending on the configuration of the dual converter module 12 in a drive configuration. For example, in regenerative configurations, power may be output from and regeneratively input to the I/O 26 or 28. The transistors 32 may be any suitable switching transistor, including, for example, insulated gate bipolar transistors (IGBTs), metal oxide semiconductor field effect transistors (MOSFETS), etc.

Figure 2B:
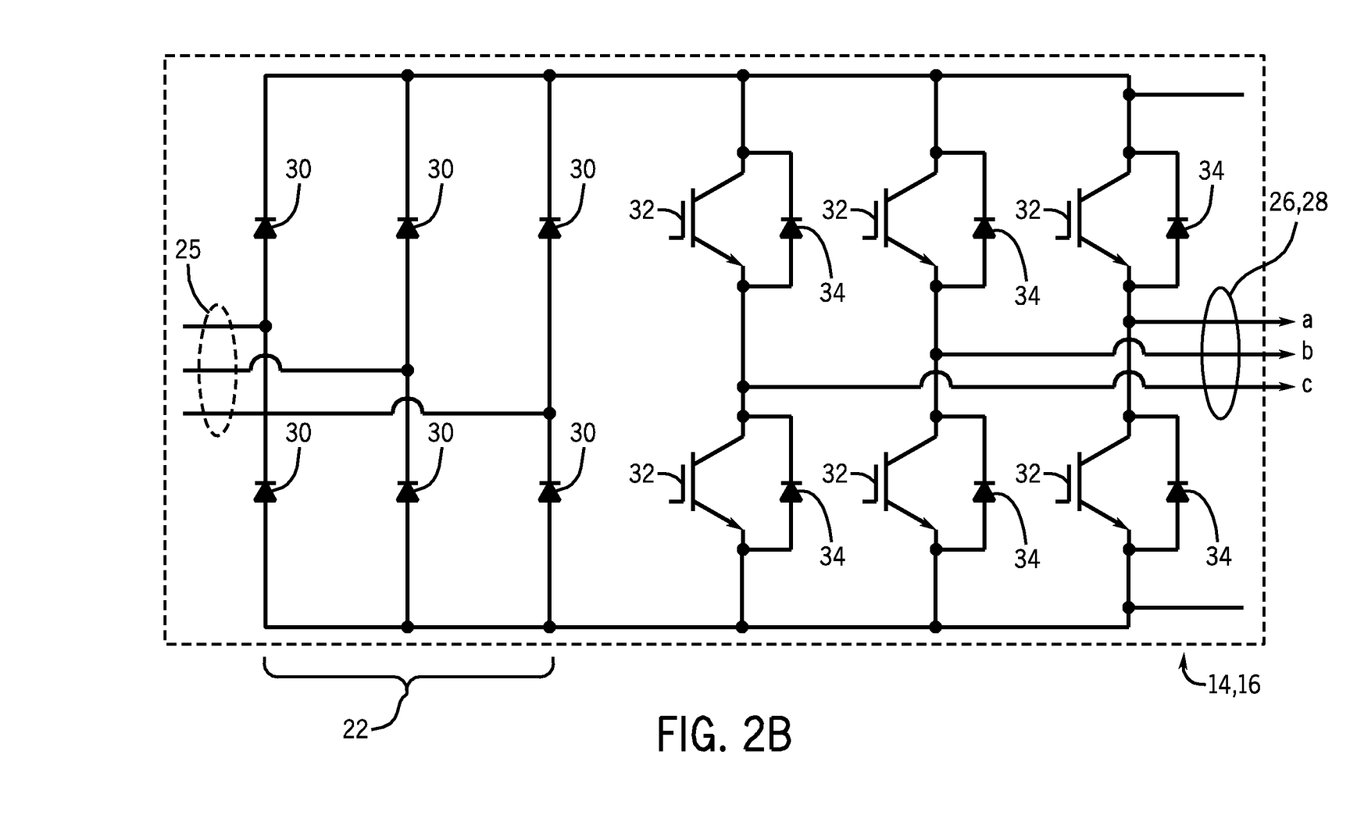
FIG. 2B is a schematic diagram of another 3-phase converter of the dual converter module of FIG. 1 having an integrated diode bridge, in accordance with an embodiment of the present techniques.

Another example of a converter 14 or 16 is provided in the schematic diagram of FIG. 2B, which, similar to the configuration presented in FIG. 2A, also includes a 3×2 array of transistors 32 configured to switch at a certain switching frequency to output voltages through the I/O 26 or 28. As discussed, while the transistors 32 illustrated in this particular embodiment are MOSFETS, any type of suitable transistor may be used in the different embodiments. In some embodiments, the converter 14 or 16 may also include an integrated diode bridge 22 configured to convert the input power from AC to DC such that the converter 14 or 16 may output a discretized three-phase output current waveform at the I/O 26 or 28. In various embodiments of the present techniques, an integrated dual converter module 12 may include converters 14 and 16 similar to any combination of the configurations provided in FIGS. 2A and 2B. For example, either or both of the converters 14 and 16 may include an integrated diode bridge 22 (as in FIG. 2B), or alternatively, neither converters 14 or 16 may include an integrated diode bridge 22.

As discussed, the integration of the dual converters 14 and 16 may increase the modularity of the dual converter module 12 in different drive configurations for various applications. A comparison of typical drive configurations with corresponding configurations implementing the dual converter module 12 of the present techniques is provided in FIGS. 3-7. As represented by the block diagrams of FIGS. 3-7, the dual converter 12 is essentially the same drive module used in various configurations. Furthermore, each of the different configurations illustrated in FIGS. 3-7 may have different or the same type of converters as each of the dual converters 14 and 16, and each of the converters 14 or 16 may have similar configurations as those presented in FIG. 2A or 2B. Various embodiments of the dual converter module 12 allows for greater flexibility and reduced configuration time, as switching the dual converter module 12 between different drive configurations can be accomplished with reduced external connections and parts. Increasing drive modularity also provides greater reliability while the drive is operating, as decreasing the number of parts and number of external connections may decrease the risk of hardware failures or degradation.

Figure 3:
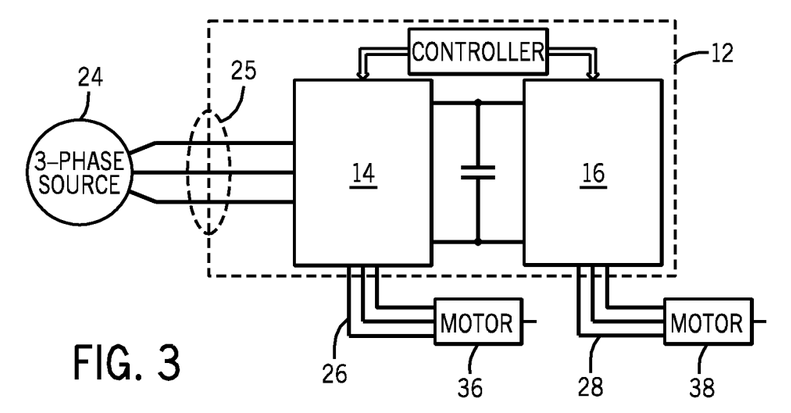
FIG. 3 is a block diagram of a dual converter module in a one per unit power rating (1pu) dual axis configuration, in accordance with an embodiment of the present techniques.

Beginning first with a dual axis configuration, as illustrated in FIG. 3, the integrated drive module 12 is powered by the power source 24, and the three phase AC current from the power source 24 is converted and driven by the converters 14 and 16 of the dual converter module 12. In the dual axis configuration, the drive module is capable of driving two motors. As illustrated in FIG. 3, each of the converters 14 and 16 of the drive module 12 may output the three phase voltages $v_a$, $v_b$, and $v_c$ via I/Os 26 and 28 to motors 36 and 38, respectively.

Figure 4:
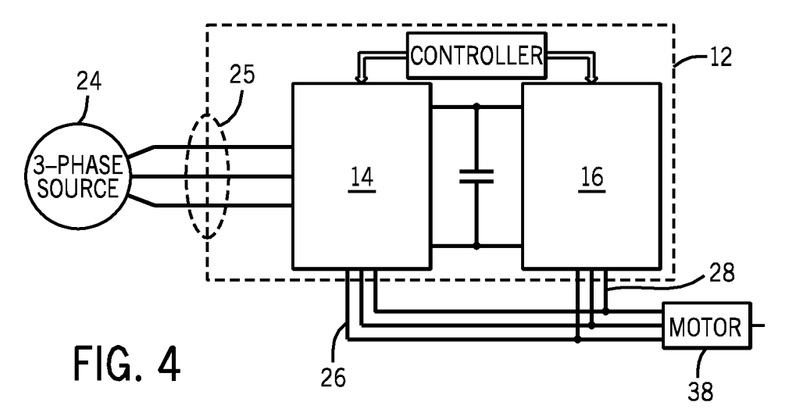
FIG. 4 is a block diagram of a dual converter module with an integrated diode bridge in a single axis two per unit power (2pu) configuration, in accordance with an embodiment of the present techniques.

A two per unit power rating (2pu) single axis configuration of a drive module 12 is illustrated in FIG. 4. Similar to the dual axis configuration illustrated in FIG. 3, current entering a typical single axis configuration of FIG. 4 is converted and driven by the dual converters 14 and 16. However, in the 2pu single axis configuration, the I/Os 26 and 28 of both converters 14 and 16 are driven to the single, higher power motor 36.

The applications for the dual axis configuration of FIG. 3 and the single axis configuration of FIG. 4 may be different, as different levels of power are output to different numbers of motors. In typical drive systems, several interconnections may be switched to transfer a drive module from a dual axis configuration to a single axis configuration. For example, switching a drive module between two different systems typically involve switching the interconnections from one motor 36 to another motor 38 for the dual axis configuration. However, in accordance with the present invention, using the dual converter module 12 may reduce such inefficiencies.

Figure 5:
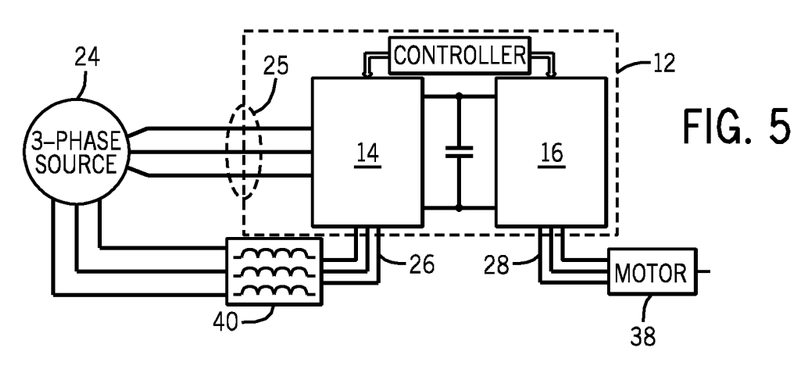
FIG. 5 is a block diagram of a dual converter module in a single axis regenerative braking configuration, in accordance with an embodiment of the present techniques.

Another example of an electric drive system configuration is a regenerative braking configuration, as illustrated in FIG. 5. In the regenerative braking configuration of FIG. 5, the output 28 of the converter 16 drives the motor 38 while the I/O 26 of the converter 14 is returned to the power source 24. For example, the energy output by the converter 14 may be stored in an electric field in the inductors 40 before it is regeneratively returned to the power source 24. Such a system is capable of using the same dual converter module 12 for other drive configurations (e.g., the dual axis configuration of FIG. 3 and the single axis configuration of FIG. 4).

In some embodiments, the dual converter module 12 has a controller 20 which is programmable to control the driving of the converters 14 and 16 depending on the configuration and/or application for which the dual converter module 12 is used. For example, the controller may control the current driven through the converters 14 and 16 and the switching of the transistors 32 differently in the dual axis configuration of FIG. 3 than in the regenerative braking configuration of FIG. 5, as the two drive configurations output power for different purposes. While both converter I/Os 26 and 28 of the dual axis configuration (FIG. 3) may drive two motors 36 and 38, one of the converters 14 of the regenerative braking configuration (FIG. 5) feeds power back to the source 24 through inductors 40.

Figure 6:
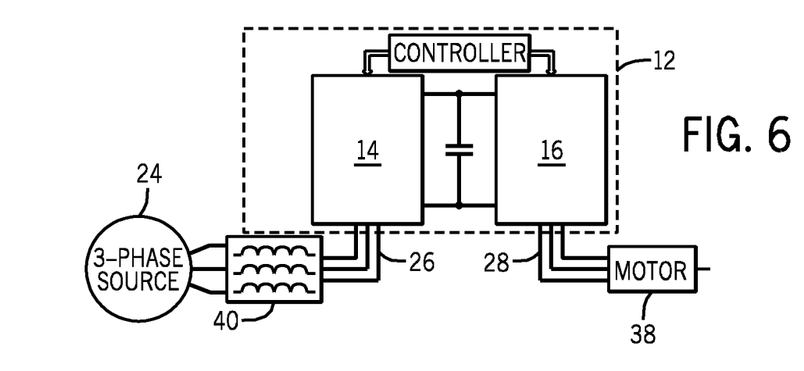
FIG. 6 is a block diagram of a dual converter module in a single axis regenerative bus supply configuration, in accordance with an embodiment of the present techniques.
Figure 7:
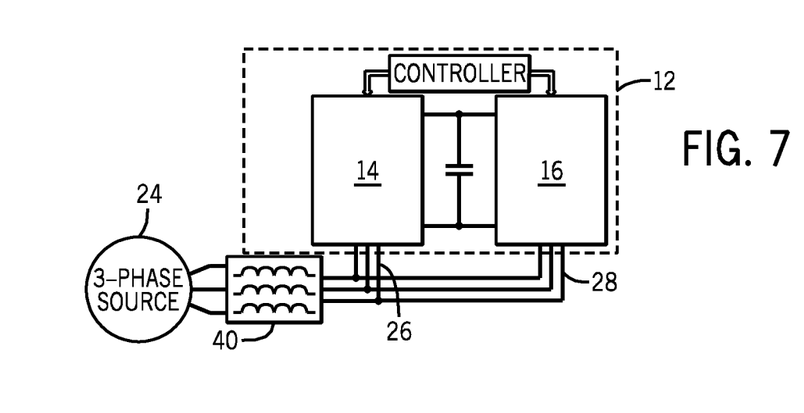
FIG. 7 is a block diagram of a dual converter module in a two per unit power (2pu) regenerative bus supply configuration, in accordance with an embodiment of the present techniques.

Further examples of drive configurations implementing the dual converter module 12 are provided in the regenerative bus supply configuration of FIG. 6, and similarly, in the 2pu regenerative bus supply configuration of FIG. 7. In one embodiment, as shown in FIG. 6, the dual converter module 12 is connected to a power source 24 for bi-directional power flow. The source 24 is capable of supplying power which flows through the three phase lines of I/O 26 to the converter 14, and the converter 16 controls the power driven to the motor 38 via the output 28. Power may flow bi-directionally and may be driven back to the source 24 via the I/O 26 of the converter 14.

As illustrated in FIG. 7, in some embodiments, the dual converter module 12 is used in a 2pu regenerative bus supply configuration, where both I/Os 26 and 28 of the converters 14 and 16, respectively, are enabled for bi-directional power flow to the power source 24. The regenerative drive configurations, such as those illustrated in FIGS. 5-7, may store power in an electromagnetic field of an inductor 40, and more than one dual converter module 12 may have their DC bus connected together. These regenerative power configurations enable higher energy efficiency by sharing the DC bus energy between multiple dual converter modules and regeneratively driving power back to the source. Furthermore, connecting multiple drive modules allows a single power source 24 to drive more than two axes. For example, in a DC common bus configuration, more than one of the multiple dual converter modules 12 may be configured for single or dual axis operation.

Figure 8:
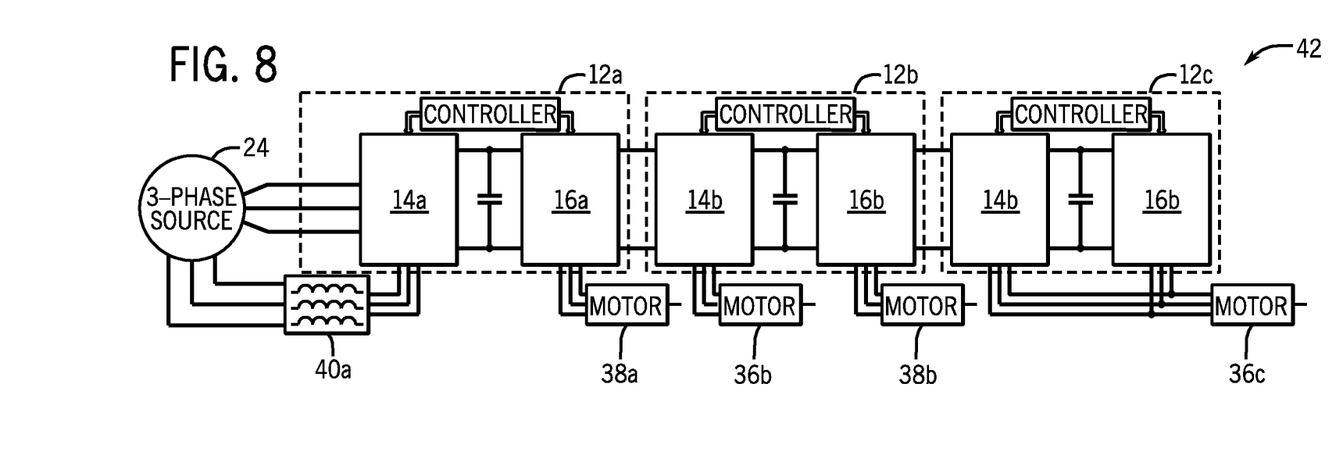
FIG. 8 is a block diagram of a multi-axis regenerative brake configuration example connecting multiple dual converter modules, in accordance with an embodiment of the present techniques.

FIG. 8 illustrates one example of a 4-axis regenerative brake common bus application where multiple drive module building blocks are used to drive four motors. The 4-axis application 42 may include three dual converter modules 12a, 12b, and 12c. The regenerative brake-configured drive module 12a (similarly arranged as the configuration provided in FIG. 5) includes a converter 14a which regeneratively returns power to the power source 24 and a converter 16a which outputs power to drive the motor 38a. The regenerative brake-configured drive module 12a is bussed to a dual axis-configured drive module 12b, and each of the converters 14b and 16b of the dual axis-configured drive module 12b drives a motor 36b and 38b, respectively. Further, the dual axis-configured drive module 12b is bussed to a 2pu single axis-configured drive module 12c, and both of the converters 14c and 16c of the 2pu single axis-configured drive module 12c drives the motor 36c. As discussed, in different embodiments, each of the converters 14 and 16 of any of the drive modules 12a, 12b, and 12c may have converter configurations similar to those provided in FIG. 2A or 2B. Implementing a dual converter module 12 increases the modularity of the system, which facilitates interchangeability of system components and overall design efficiency. Different design decisions may be based on application specifications and balancing cost efficiency and design efficiency.

Figure 9:
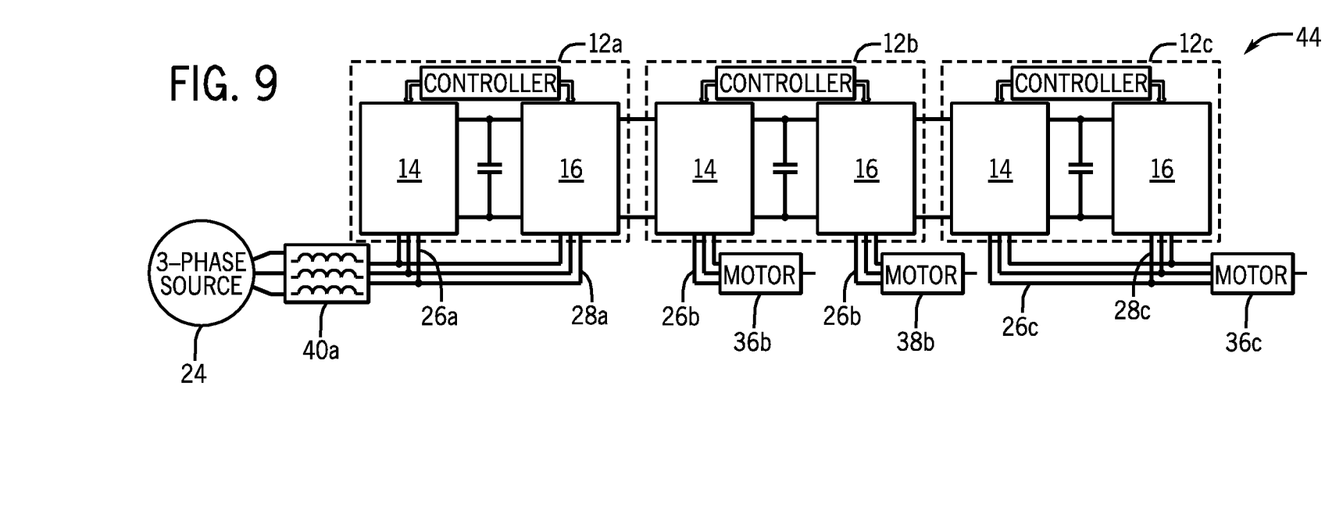
FIG. 9 is a block diagram of a multi-axis regenerative bus supply configuration example connecting multiple dual converter modules, in accordance with an embodiment of the present techniques.

An example of a 3-axis regenerative brake common bus application is provided in FIG. 9. The 3-axis application 44 includes multiple dual converter module building blocks used to drive three motors. Similar to the 4-axis application 42, the 3-axis application 44 may include three dual converter modules 12a, 12b, and 12c. The first drive module 12a in the bus which receives power from the power source 24 is a 2pu regenerative bus supply module 12a. The 2pu regenerative bus supply module 12a is connected to a dual axis-configured drive module 12b and a single axis-configured drive module 12c. The 2pu regenerative bus supply module 12a includes a converter 14a and a converter 16a which regeneratively returns power to the power source 24. The dual axis-configured drive module 12b, through converters 14b and 16b, drive a motor 36b and 38b, respectively. Further, both of the converters 14c and 16c of the 2pu single axis-configured drive module 12c drives the motor 36c.

Figure 10:
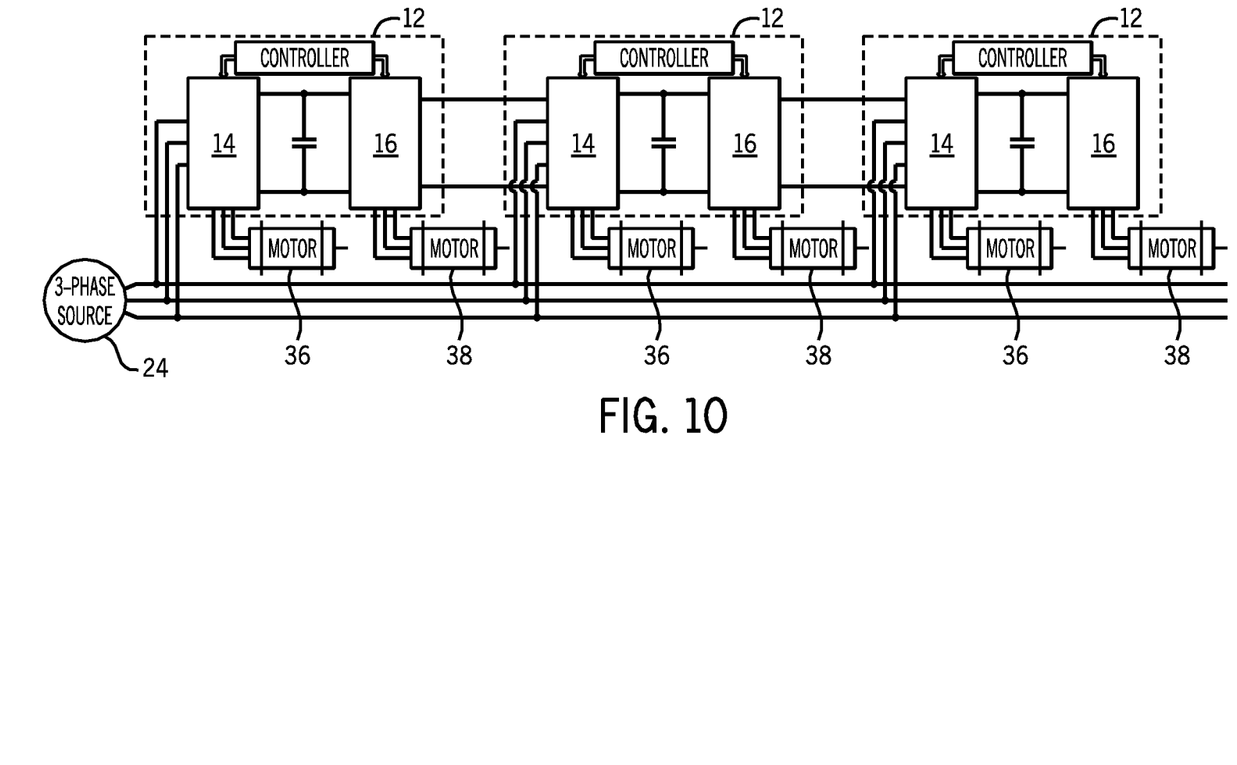
FIG. 10 is a block diagram of a multi-axis shared AC/DC configuration example connecting multiple dual converter modules in accordance with an embodiment of the present techniques.

Furthermore, an example of a 6-axis shared AC/DC application is provided in FIG. 10. The 6-axis application includes three dual axis-configured drive modules, each configured to drive a motor 36 and a motor 38, or a total of six motors. In other embodiments, a drive system may include fewer or more modules bussed together to drive various numbers of motors 36 and/or 38.

Thus, to configure a multi-axis electric drive system, a dual converter module 12 may be used in various configurations and may be connected with more than one other dual converter module 12 to form multi-axis drive configurations. The combination of multiple modular drives may enable increased control and monitoring of a module driving a particular motor. For example, in applications such as industrial packaging, a multi-axis configuration including multiple dual converter modules may be used for various parts of the packaging assembly. Furthermore, drive failures or changes in application requirements which necessitate changes in driver assembly may be performed by replacing a dual converter module 12 and/or changing the interconnections between coupled dual converter modules 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A drive module, comprising:
 a printed circuit board (PCB);
 a dual converter comprising a first converter and a second converter disposed directly on the PCB;
 a power module input coupled to the PCB;
 a first power module output and a second power module output from the first converter, wherein the first power module output is coupled to the second converter; and
 a third power module output from the second converter, wherein the drive module is configured for either a dual axis configuration, a 2pu single axis configuration, a regenerative bus supply configuration, a 2pu regenera- tive bus supply configuration, a regenerative braking configuration, a shared AC/DC configuration or any combination thereof.

2. The module of claim 1, comprising a controller configured to control an operation of the dual converter.

3. The module of claim 2, wherein the controller is configured to control a current and a voltage driven by the dual converter.

4. The module of claim 2, wherein the controller is configured to control the dual converter based on an application of the drive module.

5. The module of claim 2, wherein the controller is configured to control the dual converter based on one or more of a desired current, voltage and power output by the first converter or the second converter.

6. The module of claim 1, wherein one or more of the second power module output or the third power module output is capable of bidirectional power flow.

7. The module of claim 6, wherein one or more of the second power output or the third power module output is capable outputting electromagnetic energy for storage.

8. The module of claim 1, wherein the second power module output from the first converter and the third power module output from the second converter are capable of being connected to a single motor.

9. The module of claim 1, wherein the second power module output from the first converter is capable of being connected to a first motor and the third power module output from the second converter is capable of being connected to a second motor.

10. The module of claim 1, wherein the second converter is configured to connect to another drive module.

11. The module of claim 1, wherein the second converter is configured to connect to another dual converter.

12. The module of claim 1, wherein the drive module is configured to share a DC bus connection with other modules.

13. The module of claim 1, wherein the drive module comprises a diode bridge coupled to and one or more of the first converter and the second converter.

14. The module of claim 1, wherein the first converter and the second converter comprise the same configuration.

15. The module of claim 1, wherein the first converter comprises a first rectifier coupled to a first inverter, wherein the first rectifier is configured to convert a first alternating current (AC) voltage into a first direct current (DC) voltage, and wherein the first inverter is configured to convert the first DC voltage into a first discretized AC voltage; and wherein the second converter comprises a second rectifier coupled to a second inverter, wherein the second rectifier is configured to convert the first discretized AC voltage into a second DC voltage, and wherein the second inverter is configured to convert the second DC voltage into a second discretized AC voltage.

16. A dual converter module, comprising:
a modular substrate;
a power input/output (I/O) coupled to the modular substrate;
a first converter disposed directly over the modular substrate and coupled to the power I/O, wherein the first converter comprises a first power output and a second power output;
a second converter disposed directly over the modular substrate, wherein the first power output is coupled to the second converter, wherein the second converter comprises a third power output; and
a controller configured to substantially control operation of the first converter and the second converter, wherein the dual converter module is configured for a dual axis configuration.

17. The dual converter module of claim 16, comprising a rectifier comprising a diode bridge configured to convert an AC current from a power source to a DC current input to the first converter.

18. The dual converter module of claim 17, wherein the second output is configured to drive power to a first motor or return power to a power source connected to the rectifier.

19. The dual converter module of claim 17, wherein the third power output is configured to drive power to a second motor or return power to a power source connected to the rectifier.

20. The dual converter module of claim 16, wherein the dual converter module is configured to be bussed with other dual converter modules.

21. The dual converter module of claim 16, wherein the first converter and the second converter are configured to share a common DC bus.

22. A dual converter module, comprising:
a modular substrate;
a power input/output (I/O) coupled to the modular substrate;
a first converter disposed directly over the modular substrate and coupled to the power I/O, wherein the first converter comprises a first power output and a second power output;
a second converter disposed directly over the modular substrate, wherein the first power output is coupled to the second converter, wherein the second converter comprises a third power output, wherein the second power output is coupled to the third power output, wherein the coupled second and third power outputs are configured to couple to a motor; and
a controller configured to substantially control operation of the first converter and the second converter.

23. A dual converter module, comprising:
a modular substrate;
a power input/output (I/O) coupled to the modular substrate;
a first converter disposed directly over the modular substrate and coupled to the power I/O, wherein the first converter comprises a first power output and a second power output;
a second converter disposed directly over the modular substrate, wherein the first power output is coupled to the second converter, wherein the second converter comprises a third power output, wherein the second power output is configured to couple to an alternating current (AC) power source and the third power output is configured to couple to a motor; and
a controller configured to substantially control operation of the first converter and the second converter.

24. A dual converter module, comprising:
a modular substrate;
a power input/output (I/O) coupled to the modular substrate;
a first converter disposed directly over the modular substrate and coupled to the power I/O, wherein the first converter comprises a first power output and a second power output;
a second converter disposed directly over the modular substrate, wherein the first power output is coupled to the second converter, wherein the second converter comprises a third power output, wherein the second power output is coupled to the third power output, wherein the coupled second and third power outputs are configured to couple to an alternating current (AC) power source; and a controller configured to substantially control operation of the first converter and the second converter.

25. A dual converter module, comprising:

a modular substrate;

a power input/output (I/O) coupled to the modular substrate;

a first converter disposed directly over the modular substrate and coupled to the power I/O, wherein the first converter is configured to receive alternating current (AC) power from an AC power source, wherein the first converter comprises a first power output and a second power output;

a second converter disposed directly over the modular substrate, wherein the first power output is coupled to the second converter, wherein the second converter comprises a third power output, wherein the second power output is configured to couple to the AC power source, and wherein the third power output is configured to couple to a motor; and a controller configured to substantially control operation of the first converter and the second converter.

26. A dual converter module, comprising:

a modular substrate comprising:
- a first power input, wherein the first power input is configured to receive three-phase alternating current (AC) power from a three-phase AC power source; and
- a second power input, wherein the second power input is configured to receive the three-phase alternating current (AC) power from the three-phase AC power source;

a first converter disposed directly over the modular substrate and coupled to the I/O three-phase AC power source via the first power input, wherein the first converter comprises a first power output and a second power output;

a second converter disposed directly over the modular substrate and coupled to the three-phase AC power source via the second power input, wherein the first power output is coupled to the second converter, wherein the second converter comprises a third power output, wherein the second power output is configured to couple to a first motor, and wherein the third power output is configured to couple to a second motor; and a controller configured to substantially control operation of the first converter and the second converter.

* * * * *